United States Patent
Hensley et al.

(10) Patent No.: US 10,623,377 B1
(45) Date of Patent: *Apr. 14, 2020

(54) ON-PREMISES DATA ACCESS AND FIREWALL TUNNELING

(71) Applicant: Progress Software Corporation, Bedford, MA (US)

(72) Inventors: John Alan Hensley, Raleigh, NC (US); Robert Christian Fischer, Durham, NC (US)

(73) Assignee: Progress Software Corporation, Bedford, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/036,205

(22) Filed: Jul. 16, 2018

Related U.S. Application Data

(63) Continuation of application No. 15/353,588, filed on Nov. 16, 2016, now Pat. No. 10,038,673, which is a
(Continued)

(51) Int. Cl.
*H04L 29/06* (2006.01)
*H04L 29/12* (2006.01)
*H04L 29/08* (2006.01)

(52) U.S. Cl.
CPC .......... *H04L 63/029* (2013.01); *H04L 61/256* (2013.01); *H04L 61/2553* (2013.01);
(Continued)

(58) Field of Classification Search
CPC ....... H04L 63/029; H04L 63/08; H04L 63/10; H04L 63/0272; H04L 61/2553;
(Continued)

(56) References Cited

U.S. PATENT DOCUMENTS

| 6,081,900 A | 6/2000 | Subramaniam et al. |
| 6,233,688 B1 | 5/2001 | Montenegro |

(Continued)

FOREIGN PATENT DOCUMENTS

EP 2819363 A1 12/2014

OTHER PUBLICATIONS

"User Datagram Protocol." Wikipedia. Wikimedia Foundation. Jan. 23, 2015. Web. Feb. 16, 2015. 6 pages. Downloaded from http://en.wikipedia.org/wiki/User_Datagram_Protocol.
(Continued)

*Primary Examiner* — Sarah Su

(74) *Attorney, Agent, or Firm* — Patent Law Works LLP

(57) ABSTRACT

A system and method for tunneling through a network separation device such as a firewall or a Network Address Translator including a first server receiving an access request from a client device to communicate with a host device, where the host device is behind the network separation device. The first server sending a message to a second server in response to receiving the access request, the message including host data for the host device. The second server is configured to send a notification to the host device, and the notification includes instructions for the host device to initialize a pass-through channel with the first server. The first server receiving a pass-through initialization request from the host device and establishing the pass-through channel for communication between the client device and the host device in response to receiving the pass-through initialization request.

20 Claims, 5 Drawing Sheets

Related U.S. Application Data continuation of application No. 14/514,244, filed on Oct. 14, 2014, now Pat. No. 9,531,678.

(60) Provisional application No. 61/891,290, filed on Oct. 15, 2013.

(52) U.S. Cl.
CPC .............. *H04L 63/08* (2013.01); *H04L 63/10* (2013.01); *H04L 67/02* (2013.01); *H04L 67/141* (2013.01); *H04L 67/145* (2013.01); *H04L 67/42* (2013.01); *H04L 63/0272* (2013.01)

(58) Field of Classification Search
CPC ..... H04L 61/256; H04L 67/02; H04L 67/141; H04L 67/145; H04L 67/42
See application file for complete search history.

(56) References Cited

U.S. PATENT DOCUMENTS

| | | |
|---|---|---|
| 7,010,702 B1 | 3/2006 | Bots et al. |
| 7,231,664 B2 | 6/2007 | Markham et al. |
| 7,269,848 B2 | 9/2007 | Seshadri |
| 7,480,065 B1 | 1/2009 | Trandal et al. |
| 7,509,492 B2 | 3/2009 | Boyen et al. |
| 7,617,527 B2 | 11/2009 | Bots et al. |
| 7,688,981 B2 | 3/2010 | Halasz et al. |
| 7,748,045 B2 | 6/2010 | Kenrich et al. |
| 8,085,746 B2 * | 12/2011 | Kiss ...................... H04L 29/125 370/338 |
| 8,447,871 B1 | 5/2013 | Szabo |
| 9,390,298 B2 | 7/2016 | Nguyen |
| 9,473,506 B1 | 10/2016 | Hensley et al. |
| 9,531,678 B1 | 12/2016 | Hensley et al. |
| 9,680,795 B2 * | 6/2017 | Buruganahalli .... H04L 63/0227 |
| 10,372,929 B1 * | 8/2019 | Hensley |
| 2002/0169980 A1 | 11/2002 | Brownell |
| 2004/0107342 A1 | 6/2004 | Pham et al. |
| 2005/0071657 A1 | 3/2005 | Ryan |
| 2005/0071658 A1 | 3/2005 | Nath et al. |
| 2005/0086289 A1 | 4/2005 | Rosenberg et al. |
| 2005/0226257 A1 | 10/2005 | Mirzabegian et al. |
| 2006/0050700 A1 | 3/2006 | Ravikumar et al. |
| 2007/0208744 A1 | 9/2007 | Krishnaprasad et al. |
| 2008/0046984 A1 | 2/2008 | Bohmer et al. |
| 2008/0133915 A1 | 6/2008 | Tanaka et al. |
| 2008/0282081 A1 * | 11/2008 | Patiejunas ............. H04L 9/3273 713/153 |
| 2009/0049200 A1 | 2/2009 | Lin et al. |
| 2009/0064208 A1 | 3/2009 | Elrod |
| 2009/0125627 A1 | 5/2009 | Ford |
| 2010/0011091 A1 | 1/2010 | Carver et al. |
| 2010/0192210 A1 | 7/2010 | Purdy, Sr. et al. |
| 2010/0242096 A1 | 9/2010 | Varadharajan et al. |
| 2010/0257372 A1 | 10/2010 | Seifert |
| 2010/0313009 A1 | 12/2010 | Combet et al. |
| 2011/0153822 A1 | 6/2011 | Rajan et al. |
| 2011/0246550 A1 | 10/2011 | Levari et al. |
| 2012/0011067 A1 | 1/2012 | Katzin et al. |
| 2012/0072548 A1 | 3/2012 | Kim |
| 2012/0072713 A1 | 3/2012 | Begum et al. |
| 2012/0131663 A1 * | 5/2012 | Anchan ............. H04L 29/12471 726/13 |
| 2012/0179905 A1 | 7/2012 | Ackerly |
| 2012/0188928 A1 * | 7/2012 | Wang .................. H04L 43/0811 370/311 |
| 2012/0233478 A1 * | 9/2012 | Mucignat ............. G06F 1/3209 713/320 |
| 2013/0117461 A1 | 5/2013 | Hsu et al. |
| 2013/0219468 A1 | 8/2013 | Bell |
| 2014/0372508 A1 | 12/2014 | Fausak et al. |
| 2015/0026460 A1 | 1/2015 | Walton et al. |
| 2015/0026474 A1 | 1/2015 | Irvine |
| 2015/0052373 A1 | 2/2015 | Gatta et al. |
| 2015/0074794 A1 | 3/2015 | Chuang et al. |
| 2015/0215185 A1 | 7/2015 | Thaler et al. |
| 2015/0341443 A1 | 11/2015 | Shen et al. |

OTHER PUBLICATIONS

Zink, et al., P2P-RMI : Transparent Distribution of Remote Java Objects, Sep. 2012, International Journal of Computer Networks Communications. 4(5), pp. 17-34. (Year: 2012).

\* cited by examiner

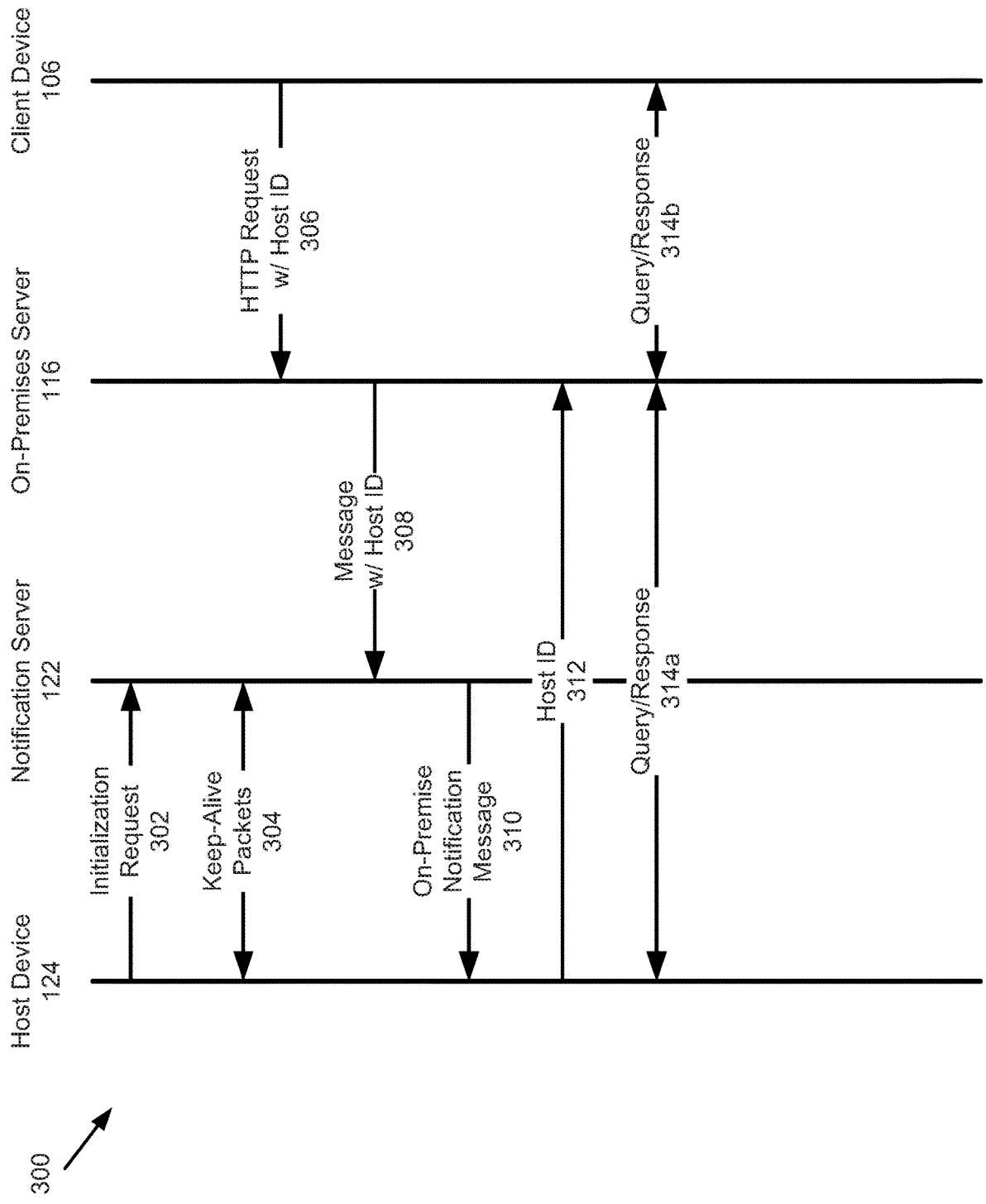

ON-PREMISES DATA ACCESS AND FIREWALL TUNNELING

CROSS-REFERENCE TO RELATED APPLICATIONS

This application is a continuation of and claims priority to U.S. application Ser. No. 15/353,588, filed Nov. 16, 2016, titled "On-Premises Data Access and Firewall Tunneling," which is a continuation of and claims priority to U.S. application Ser. No. 14/514,244, filed Oct. 14, 2014, titled "On-Premises Data Access and Firewall Tunneling," which claims priority under 35 U.S.C. § 119, of U.S. Provisional Patent Application No. 61/891,290, filed Oct. 15, 2013 and entitled "On-Premises Data Access and Firewall Tunneling" the entireties of which are hereby incorporated by reference.

Applicants hereby notify the USPTO that the claims of the present application are different from those of the parent application and any other related applications. Therefore, Applicants rescind any disclaimer of claim scope made in the parent application or any other predecessor application in relation to the present application. The Examiner is therefore advised that any such disclaimer and the cited reference that it was made to avoid may need to be revisited at this time. Furthermore, the Examiner is also reminded that any disclaimer made in the present application should not be read into or against the parent application, the grandparent application or any other related application.

FIELD OF INVENTION

The present disclosure relates to accessing data behind a network separation device (e.g., a firewall and/or network address translator (NAT)).

SUMMARY

In one embodiment, data behind a network separation device (e.g., a firewall and/or NAT), i.e. "on-premises data," is associated with a host device. The host device initiates and maintains a connection with a notification server. A client device seeking to access the on-premises data sends a request identifying the host device to an on-premises server. The on-premises server contacts the notification server with the identity of the host device. The notification server sends an on-premises notification message to the host device. The host device, upon receiving the on-premises notification message, establishes a connection/pass-through channel with the on-premises server through the firewall and/or NAT, thereby establishing a connection between the client device and the host device through the on-premises server.

BRIEF DESCRIPTION OF THE DRAWINGS

The disclosure is illustrated by way of example, and not by way of limitation in the figures of the accompanying drawings in which like reference numerals are used to refer to similar elements.

FIG. 3 is a flowchart of an example method for on-premises data access according to one embodiment.

DETAILED DESCRIPTION

Figure 1:
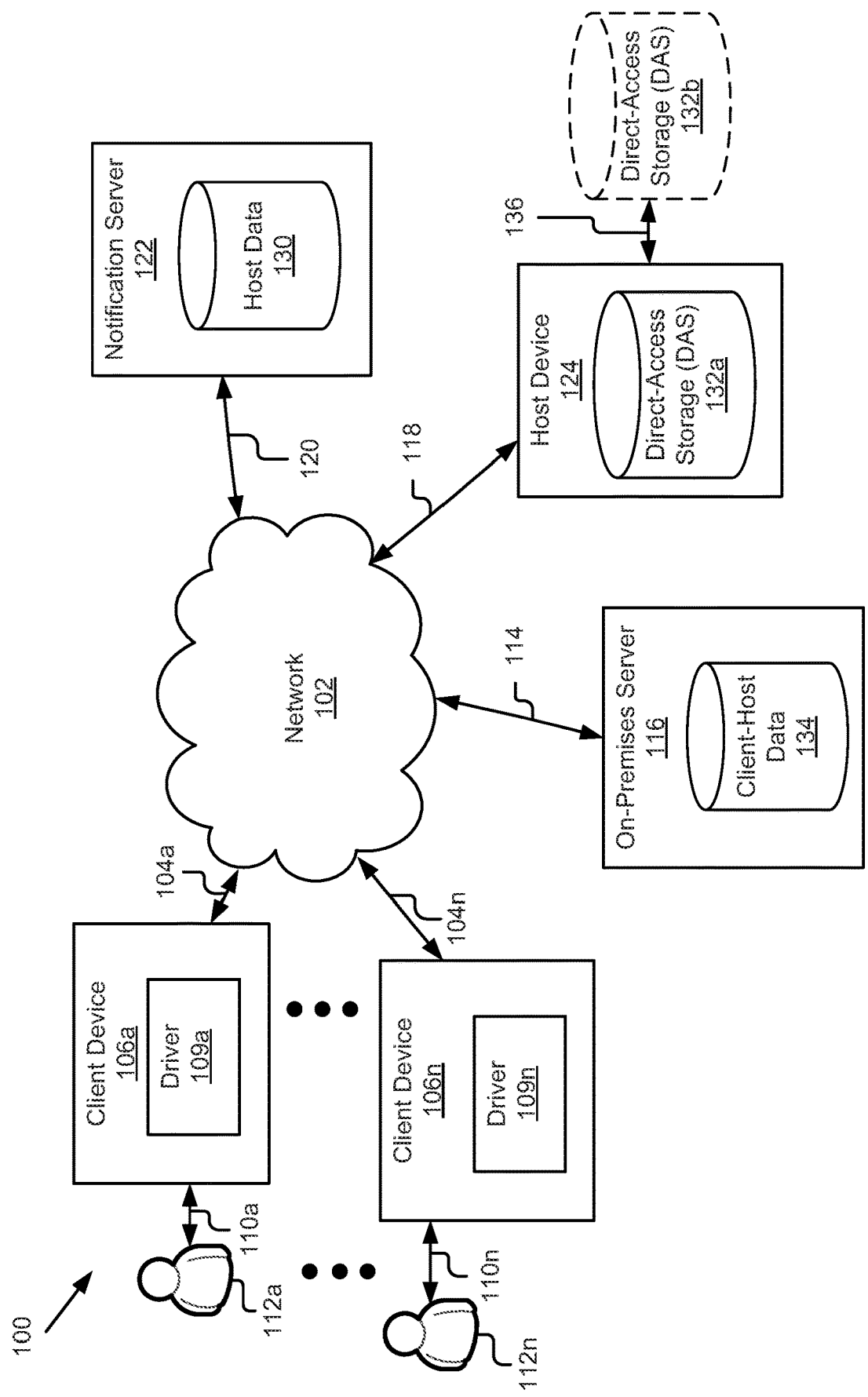
FIG. 1 is a block diagram illustrating an example system for on-premises data access according to one embodiment.

FIG. 1 is a block diagram illustrating an example system 100 for on-premises data access according to one embodiment. The illustrated system 100 includes client devices 106a . . . 106n, an on-premises server 116, a notification server 122 and a host device 124, which are communicatively coupled via a network 102 for interaction with one another. For example, the client devices 106a . . . 106n (also referred to individually and collectively as 106) may be respectively coupled to the network 102 via signal lines 104a . . . 104n and may be accessed by users 112a . . . 112n (also referred to individually and collectively as 112) as illustrated by lines 110a . . . 110n. The on-premises server 116 may be coupled to the network 102 via signal line 114. The host device 124 may be coupled to the network 102 via signal line 118. The notification server 122 may be coupled to the network 102 via signal line 120. The use of the nomenclature "a" and "n" in the reference numbers indicates that any number of those elements having that nomenclature may be included in the system 100.

The network 102 may include any number of networks and/or network types. For example, the network 102 may include, but is not limited to, one or more local area networks (LANs), wide area networks (WANs) (e.g., the Internet), virtual private networks (VPNs), mobile networks (e.g., the cellular network), wireless wide area network (WWANs), Wi-Fi networks, WiMAX® networks, Bluetooth® communication networks, peer-to-peer networks, other interconnected data paths across which multiple devices may communicate, various combinations thereof, etc. Data transmitted by the network 102 may include packetized data (e.g., Internet Protocol (IP) data packets) that is routed to designated computing devices coupled to the network 102. In some implementations, the network 102 may include a combination of wired and wireless (e.g., terrestrial or satellite-based transceivers) networking software and/or hardware that interconnects the computing devices of the system 100. For example, the network 102 may include packet-switching devices that route the data packets to the various computing devices based on information included in a header of the data packets.

The data exchanged over the network 102 can be represented using technologies and/or formats including the hypertext markup language (HTML), the extensible markup language (XML), JavaScript Object Notation (JSON), Comma Separated Values (CSV), etc. In addition, all or some of links can be encrypted using conventional encryption technologies, for example, the secure sockets layer (SSL), Secure HTTP (HTTPS) and/or virtual private networks (VPNs) or Internet Protocol security (IPsec). In another embodiment, the entities can use custom and/or dedicated data communications technologies instead of, or in addition to, the ones described above. Depending upon the embodiment, the network 102 can also include links to other networks.

The client devices 106 are computing devices having data processing and communication capabilities. While FIG. 1 illustrates two client devices 106, the present specification applies to any system architecture having one or more client devices 106. In some embodiments, a client device 106 may include a processor (e.g., virtual, physical, etc.), a memory, a power source, a network interface, and may include other components whether software or hardware, such as a display, graphics processor, wireless transceivers, keyboard, camera, sensors, firmware, operating systems, drivers, various physical connection interfaces (e.g., USB, HDMI, etc.). The client devices 106a . . . 106n may couple to and communicate with one another and the other entities of the system 100 via the network 102 using a wireless and/or wired connection.

Examples of client devices 106 may include, but are not limited to, mobile phones (e.g., feature phones, smart phones, etc.), tablets, laptops, desktops, netbooks, server appliances, servers, virtual machines, TVs, set-top boxes, media streaming devices, portable media players, navigation devices, personal digital assistants, etc. While two or more client devices 106 are depicted in FIG. 1, the system 100 may include any number of client devices 106. In addition, the client devices 106a . . . 106n may be the same or different types of computing devices. In the depicted implementation, the client devices 106a . . . 106n respectively contain instances 109a . . . 109n of a driver 109 (also referred to individually and collectively as driver 109). The driver 109 may be storable in a memory and executable by a processor of a client device 106. In some embodiments, the client device 106 may also include applications for making phone calls, video calls, messaging, social networking, gaming, capturing digital video, and/or images, authoring documents, etc.

The host device 124 is a computing device having data processing and communication capabilities. While FIG. 1 illustrates one host device 124, the present specification applies to any system architecture having one or more host devices 124. In some embodiments, a host device 124 may include a processor (e.g., virtual, physical, etc.), a memory, a power source, a network interface, and may include other components whether software or hardware, such as a display, graphics processor, wireless transceivers, keyboard, camera, sensors, firmware, operating systems, drivers, various physical connection interfaces (e.g., USB, HDMI, etc.). The host device 124 may couple to and communicate with other entities of the system 100 via the network 102 using a wireless and/or wired connection.

Examples of a host device 124 may include, but are not limited to, mobile phones (e.g., feature phones, smart phones, etc.), tablets, laptops, desktops, netbooks, server appliances, servers, virtual machines, TVs, set-top boxes, media streaming devices, portable media players, navigation devices, personal digital assistants, etc. While one host device 124 is depicted in FIG. 1, the system 100 may include any number of host devices 124. In addition, a plurality of host devices 124 may be of the same or different types of computing devices. In the depicted implementation, the host device 124 includes or is coupled (as illustrated by signal line 136) to a Direct Access Storage 132a or 132b, respectively. In one embodiment, the on-premises data is stored by a DAS 132a/132b. In some embodiments, the host device 124 may also include applications for making phone calls, video calls, messaging, social networking, gaming, capturing digital video, and/or images, authoring documents, etc.

The on-premises server 116 may include one or more computing devices having data processing, storing, and communication capabilities. For example, the on-premises server 116 may include one or more hardware servers, server arrays, storage devices, systems, etc., and/or may be centralized or distributed/cloud-based. In some implementations, the on-premises server 116 may include one or more virtual servers, which operate in a host server environment and access the physical hardware of the host server including, for example, a processor, memory, storage, network interfaces, etc., via an abstraction layer (e.g., a virtual machine manager). In one embodiment, the on-premises server 116 stores and accesses client-host data 134, which may be used to match a connection the on-premises server 116 has with a client device 106 requesting on-premises data access from a host device 124 with a connection that the on-premises server 116 has with that host device 124. Although, the on-premises server 116 is named "on-premises," for the purposes of the on-premises server 116 the use of the term "on-premises" is merely a naming convention. In some implementations, the on-premises server 116 may be located on the same premises as, for example, the host device 124. In some implementations, the on-premises server 116 maybe located at a remote location from, for example, the host device 124.

Similar to the on-premises server 116, the notification server 122 may include one or more computing devices having data processing, storing, and communication capabilities. For example, the notification server 122 may include one or more hardware servers, server arrays, storage devices, systems, etc., and/or may be centralized or distributed/cloud-based. In some implementations, the notification server 122 may include one or more virtual servers, which operate in a host server environment and access the physical hardware of the host server including, for example, a processor, memory, storage, network interfaces, etc., via an abstraction layer (e.g., a virtual machine manager). In one embodiment, the notification server 122 stores and maintains host data, which may include an identifier associated with a host device 124 that has initiated and maintained a connection with the notification server 122.

It should be understood that the system 100 illustrated in FIG. 1 is representative of an example system for on-premises data access according to one embodiment and that a variety of different system environments and configurations are contemplated and are within the scope of the present disclosure. For instance, various functionality may be moved from a server to a client, or vice versa and some implementations may include additional or fewer computing devices, services, and/or networks, and may implement various functionality client or server-side. Further, various entities of the system 100 may be integrated into to a single computing device or system or additional computing devices or systems, etc.

In one embodiment, a computing device, whether a client device 106, a notification server 122, an on-premise server 116 or a host device 124, may include a processor (not shown), a memory (not shown), a communication unit (not shown), which may be communicatively coupled by a communications bus (not shown). However, it should be understood that a computing device may take other forms and include additional or fewer components without departing from the scope of the present disclosure. For example, a computing device may include input and output devices (e.g., a display, a keyboard, a mouse, touch screen, speakers, etc.), various operating systems, sensors and other physical configurations.

The processor may execute code, routines and software instructions by performing various input/output, logical, and/or mathematical operations. The processor may have various computing architectures to process data signals including, for example, a complex instruction set computer (CISC) architecture, a reduced instruction set computer (RISC) architecture, and/or an architecture implementing a combination of instruction sets. The processor may be physical and/or virtual, and may include a single core or plurality of processing units and/or cores. In some implementations, the processor may be capable of generating and providing electronic display signals to a display device (not shown), supporting the display of images, capturing and transmitting images, performing complex tasks including various types of feature extraction and sampling, etc. In some implementations, the processor may be coupled to the memory of the computing device via the bus to access data and instructions therefrom and store data therein. The bus may couple the processor to the other components of the computing device including, for example, the memory and communication unit.

The memory may store and provide access to data to the other components of the computing device. In some implementations, the memory may store instructions and/or data that may be executed by the processor. For example, the memory of the client device 106 may store the driver 109. The memory is also capable of storing other instructions and data, including, for example, an operating system, hardware drivers, other software applications, databases, etc. The memory may be coupled to the bus for communication with the processor and the other components of the computing device. In one embodiment, the memory of the computing device stores the code and routines that, when executed by the computing device's processor, perform the functions of that computing device as described herein. For example, the functionality described below with reference to host device 124 may be performed when code and routines stored on the host device 124 are executed by the processor of the host device 124.

The memory includes a non-transitory computer-usable (e.g., readable, writeable, etc.) medium, which can be any apparatus or device that can contain, store, communicate, propagate or transport instructions, data, computer programs, software, code, routines, etc., for processing by or in connection with the processor. In some implementations, the memory may include one or more of volatile memory and non-volatile memory. For example, the memory may include, but is not limited, to one or more of a dynamic random access memory (DRAM) device, a static random access memory (SRAM) device, a discrete memory device (e.g., a PROM, FPROM, ROM), a hard disk drive, an optical disk drive (CD, DVD, Blue-ray™, etc.). It should be understood that the memory may be a single device or may include multiple types of devices and configurations.

The bus can include a communication bus for transferring data between components of a computing device or between computing devices, a network bus system including the network 102 or portions thereof, a processor mesh, a combination thereof, etc. The software communication mechanism can include and/or facilitate, for example, inter-process communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The communication unit may include one or more interface devices (I/F) for wired and/or wireless connectivity with the network 102. For instance, the communication unit may include, but is not limited to, CAT-type interfaces; wireless transceivers for sending and receiving signals using radio transceivers (4G, 3G, 2G, etc.) for communication with the mobile network 103, and radio transceivers for Wi-Fi™ and close-proximity (e.g., Bluetooth®, NFC, etc.) connectivity, etc.; USB interfaces; various combinations thereof; etc. In some implementations, the communication unit can link the processor to the network 102, which may in turn be coupled to other processing systems. The communication unit can provide other connections to the network 102 and to other entities of the system 100 using various standard network communication protocols, including, for example, those discussed elsewhere herein.

As mentioned above, a computing device may include other and/or fewer components. Examples of other components may include a display, an input device, a sensor, etc. (not shown). In one embodiment, the computing device includes a display. The display may display electronic images and data output by the computing device for presentation to a user. The display may include any conventional display device, monitor or screen, including, for example, an organic light-emitting diode (OLED) display, a liquid crystal display (LCD), etc. In some implementations, the display may be a touch-screen display capable of receiving input from a stylus, one or more fingers of a user, etc. For example, the display may be a capacitive touch-screen display capable of detecting and interpreting multiple points of contact with the display surface.

The input device (not shown) may include any device for inputting information into the computing device. In some implementations, the input device may include one or more peripheral devices. For example, the input device may include a keyboard (e.g., a QWERTY keyboard or keyboard in any other language), a pointing device (e.g., a mouse or touchpad), microphone, an image/video capture device (e.g., camera), etc. In some implementations, the input device may include a touch-screen display capable of receiving input from the one or more fingers of the user. For example, the user could interact with an emulated (i.e., virtual or soft) keyboard displayed on the touch-screen display by using fingers to contacting the display in the keyboard regions.

Figure 2A:
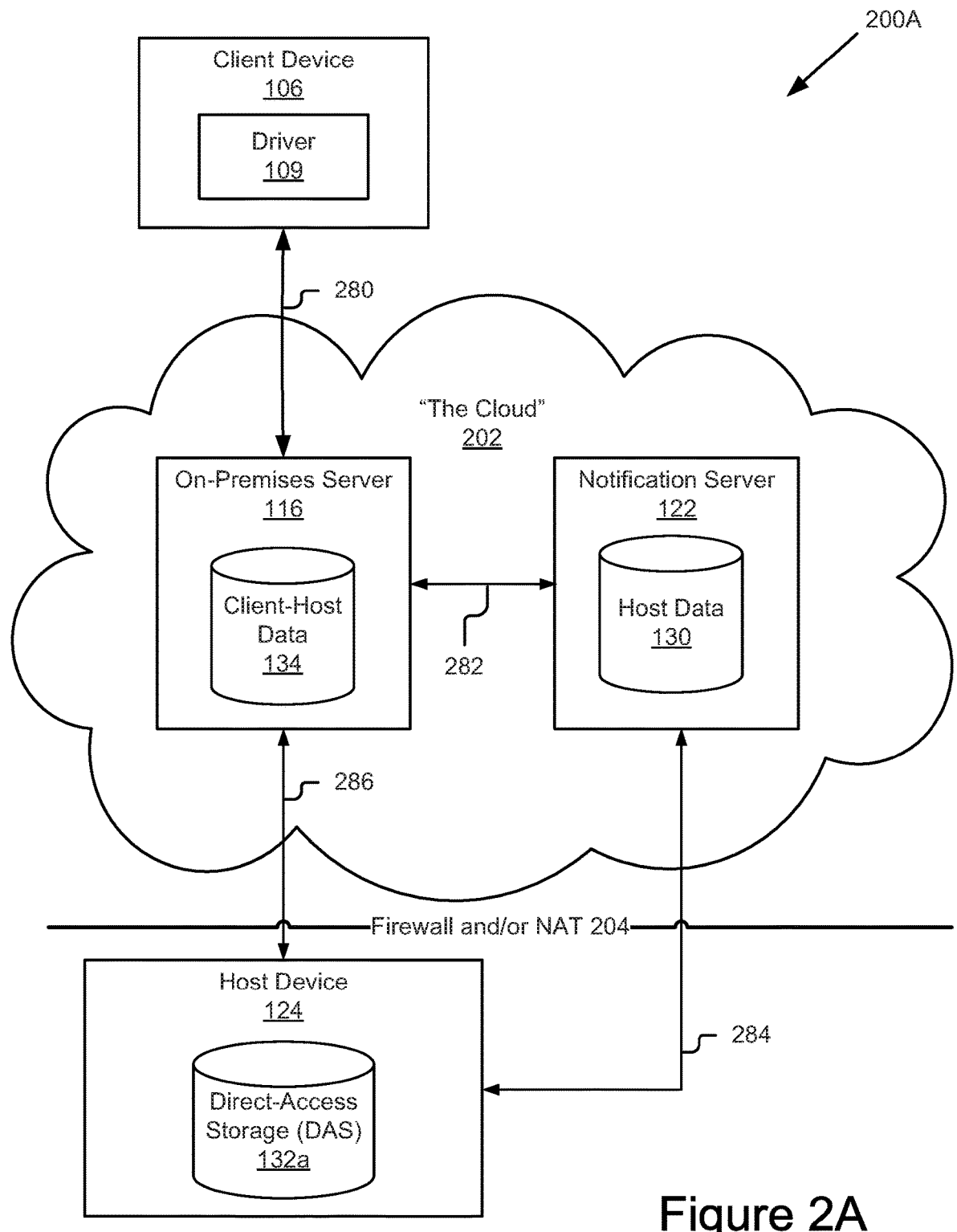
FIG. 2A is a block diagram illustrating an example system for on-premises data access according to one embodiment.

FIG. 2A is a block diagram illustrating an example system for on-premises data access according to one embodiment. In the illustrated embodiment, the host device 124 is behind a network separation device (e.g., firewall and/or network address translator (NAT), referred to herein as a firewall and/or NAT) as indicated by line 204. Because the host device 124 is behind a firewall and/or NAT, the client device 106 may not directly access and communicate with the host device 124, because, for example, the firewall may prohibit the client device 106 (which may be behind its own firewall and/or NAT (not shown)) from being aware of the host device's 124 existence behind the firewall and/or the NAT's address translation does not allow for a connection to a "known" port.

In one embodiment, this issue is over come and on-premises data access, i.e., access to data located behind a firewall and/or NAT, is obtained using the on-premises server 116 and the notification server 122 as described below. As illustrated in system 200A, in one embodiment, one or more of the on-premises server 116 and the notification server 122 may be cloud 202 based servers.

As illustrated, the client device 106 may communicatively couple to the on-premises server 116 as illustrated by signal line 280; the on-premises server may communicatively couple with the notification server 122 as illustrated by signal line 282; and the host device 124 may communicatively couple to the notification server 122 via a notification channel as illustrated by signal line 284 and to the on-premises server 116 via a pass-through channel as illustrated by 286.

In one embodiment, the connections 280, 282, 284, 286 are each established over the network 102 (e.g., including the Internet) and used as described below with reference to FIGS. 2B-4 and the methods 200B, 300 and 400 therein. For example, referring to FIGS. 2A&B, in one embodiment, the connection 284 (i.e., the notification channel) between the host device 124 and the notification server 122 is established by the host device 124 sending an initialization request 206, maintained by keep-alive packets 208 and delivers an on-premises notification message 214. In another example, still referring to FIGS. 2A&B, the connection 286 between the host device 124 and the on-premises server 116 is established by the host device 124 sending a host ID 216, and used to exchange queries 218b and responses 220a.

It should be recognized that the methods 200B, 300 and 400) are merely examples and that other examples and embodiments exist. It should further be understood that the system 200A illustrated in FIG. 2A is representative of an example system for on-premises data access according to one embodiment and that a variety of different system environments and configurations are contemplated and are within the scope of the present disclosure. For instance, various functionality may be moved from a server to a client, or vice versa and some implementations may include additional or fewer computing devices, services, and/or networks, and may implement various functionality client or server-side. Further, various entities of the system 200A may be integrated into to a single computing device or system or additional computing devices or systems, etc.

Example Methods

Figure 2B:
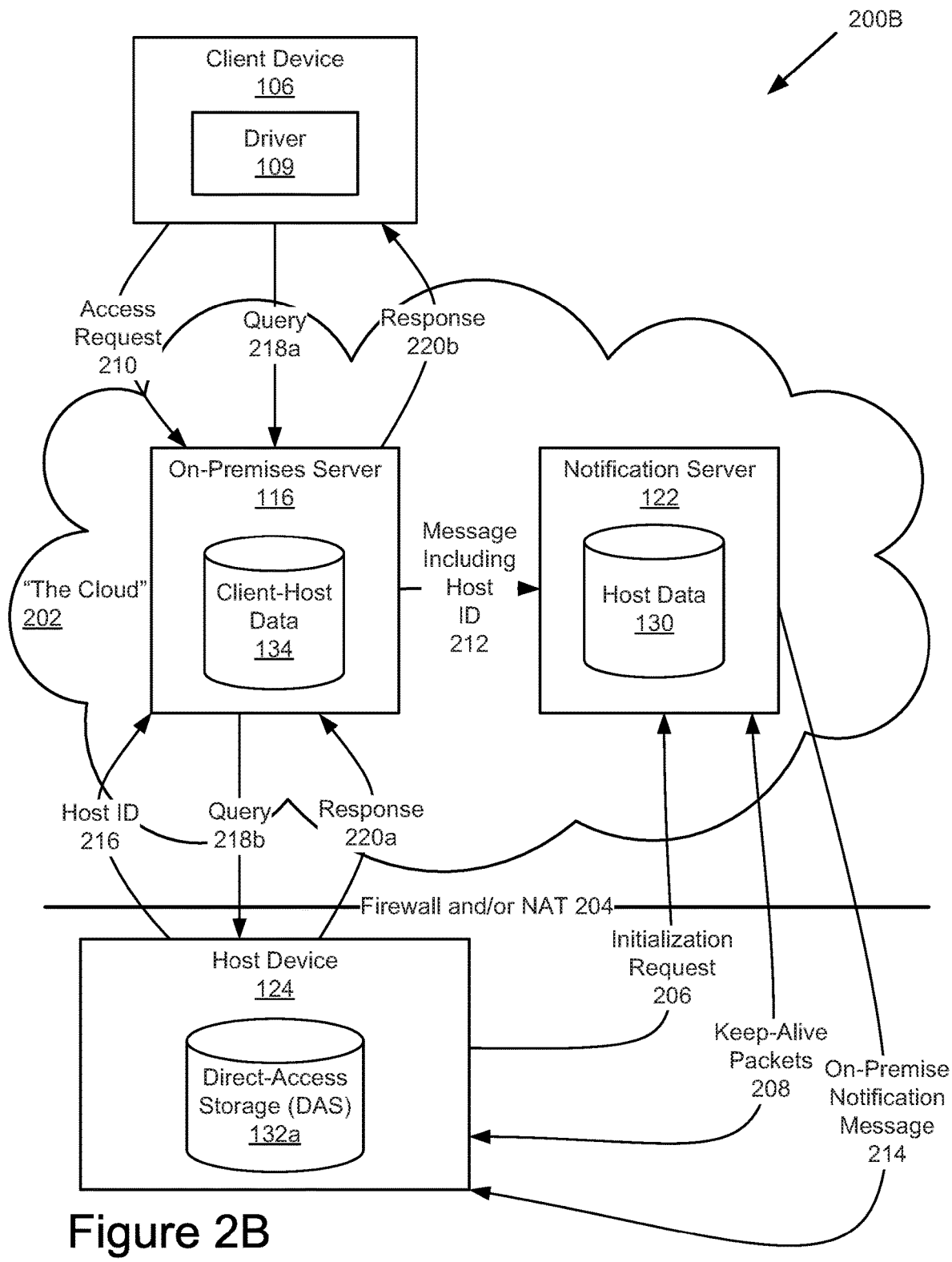
FIG. 2B is a block diagram illustrating an example system and method for on-premises data access and related communications according to one embodiment.
Figure 4:
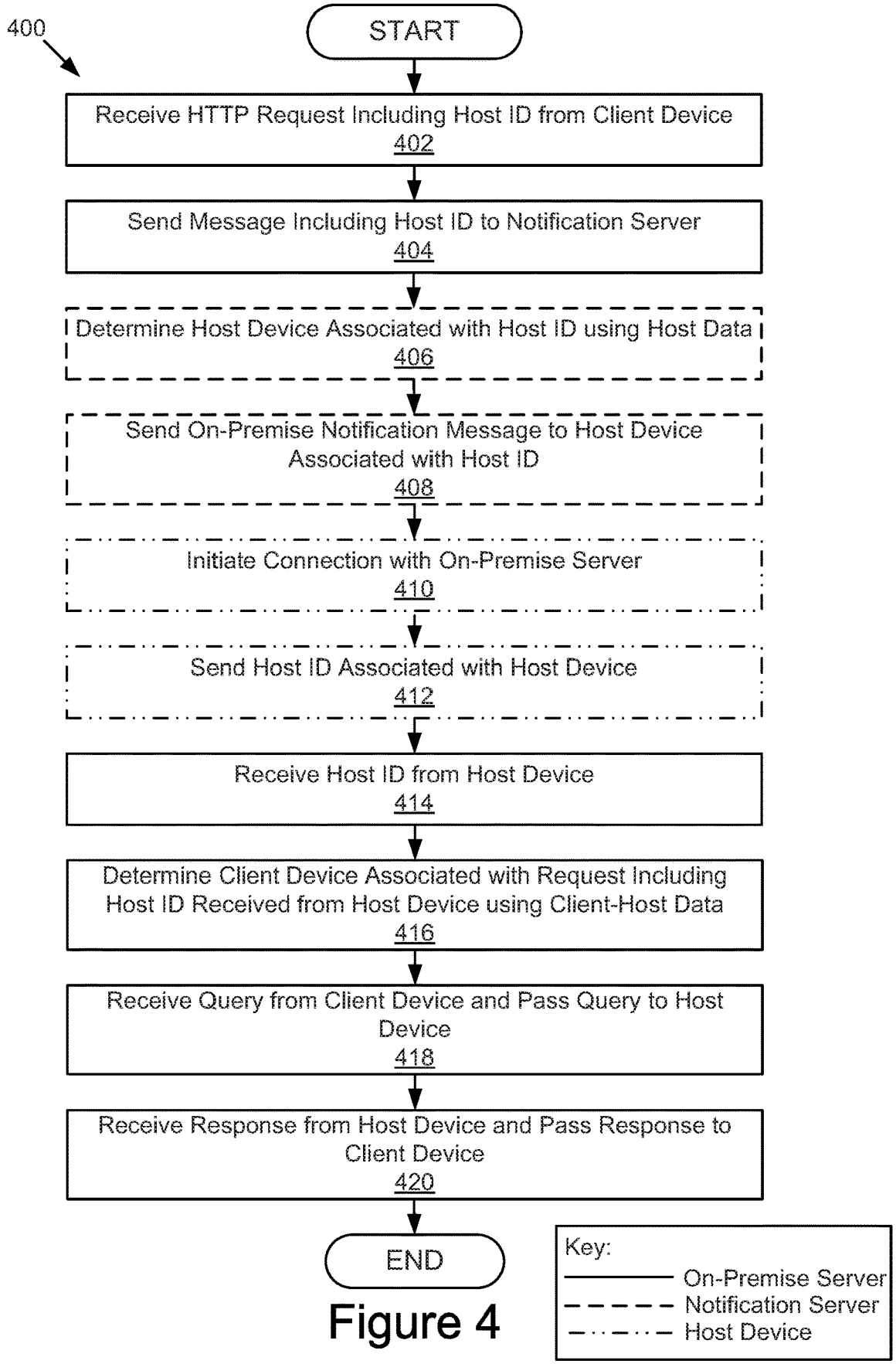
FIG. 4 is a flowchart of an example method for on-premises data access according to one embodiment.

FIGS. 2B-4 depict methods 200B, 300, 400 performed by the system described above in reference to FIGS. 1-2A. However, it should be recognized that other or additional protocols and message services may be used without departing from the teachings herein.

Referring to FIG. 2B an example method 200B for on-premises access with references to system 200A is shown access according to one embodiment is shown. In the illustrated embodiment, the host device 124 sends an initialization request 206 to the notification server 122. In one embodiment, the initialization request 206 is sent by the host device 124 responsive to a determination by the host device 124 to make data available for on-premises access. For example, upon start-up (or upon or request by a user of the host device 124), the host device 124 determines that it is going to make data available for on-premises access and sends an initialization request 206 to the notification server. In one embodiment, the initialization request received from the host device 124 is used by the notification server 122 to register (not shown) the host device 124. In one embodiment, this registration is stored as host data 130 by the notification server 122. For example, the host data 130 includes the host ID of the host device 124 sending 302 the initialization request and the port(s) by which the notification server 122 is communicating with that host device 124 and is stored in the memory of the notification server 122.

It will be recognized that because of the NAT and/or firewall, the notification server 122 may not be able to initiate communication with the host device 124. However, since the host device 124 initiates the communication with the notification server 122, a hole is "punched" through the network separation device a.k.a. the firewall and/or NAT 204 and the host device 124 and notification server 122 are able to communicate. The notification server 122 exchanges 208 keep-alive packets, occasionally referred to herein as a "heart beat," to maintain the connection (i.e., notification channel) through the firewall and/or NAT 204. In some embodiments, the keep-alive packets are exchanged periodically with a frequency sufficient to prevent time-out of the connection between the notification server 122 and the host device 124. For example, keep-alive packet may be sent every 15 seconds. It will be recognized that while the keep-alive packet exchange is illustrated as bidirectional between the host device 124 and the notification server 122, in some embodiments, the keep-alive packets may be unidirectional, for example, from host device 124 to notification server 122 or from notification server 122 to host device 124. Regardless, a connection between the notification server 122 and host device 124 is maintained by the keep-alive packets.

At some point in time, a client device 106 seeking to access on-premises data from the host device 124 sends an access request 210 to the on-premises server 116. The access request identifies a host device 124 and requests that the on-premises server 116 connect the requesting client device 106 with the identified host-device 124. For example, in one embodiment, the access request is an HTTP request and includes a host ID associated with a host device 124. In one embodiment, the host ID is globally unique identifier (GUID) associated with the host device 124.

Subsequent to receiving the access request 210, the on-premises server 116 sends a message with host data including the identity of the requested host device 124 (e.g., the host ID) to the notification server 122. For example, in one embodiment, the on-premises server 116 sends 212 a message including the host ID to the notification server 122. The notification server 122 determines (not shown) whether it is in communication with the identified host device 124. For example, in one embodiment, the notification server 122 checks host data 130 (e.g. a list, table or other data structure) to see whether the identified host device 124 has registered with the notification server 122 and, if so, whether the notification server 122 still has a connection with the identified host device 124. In one embodiment, if the notification server 122 does not have a connection (i.e., if the notification channel is/has closed) to the host device 124, the on-premises access is denied and a denial message (not shown) may be sent to the on-premises server 116 and may be propagated (not shown) by the on-premises server 116 to the client device 106.

Responsive to determining (not shown) that the notification server 122 has a connection with the identified host device 124, the notification server 122 sends 310 an on-premises notification message to the host device 124 using the connection being maintained by the exchange 208 of keep-alive packets. The host device 124 upon receiving 214 the on-premises notification message knows a client device 106 is attempting to access on-premises data associated with the host device 124 and initiates a connection (i.e., a pass-through channel) with the on-premises server 116, and the host device 124 sends 216 its host ID to the on-premises server 116, thereby "punching" through the firewall so the host device 124 and on-premises server 116 are able to communicate via a pass-through channel.

The on-premises server 122 matches (not shown) the host ID received 312 from the host device 124 with the client data from the client device 106 that sent the access request 210 identifying the host device 124 associated with the received 216 host ID. In one embodiment, the notification server 122 maintains client-host data 134. In one embodiment, client-host data 134 may include one or more of a table, a list or another data structure for tracking and matching a client device 106 that sent an access request with the host device 124 associated with that request.

In one embodiment, once the on-premises server 122 matches (not shown) the host device 124 and the client device 106, the on-premises server 122 may notify (not shown) the client device 106 that a connection (i.e., the pass-through channel) has been established with the host device 124. The on-premises server 122 may then receive 218a queries from the client device 106 and pass 218b to the host device 124, and receive responses 220a from the host device 124 and pass 220b the responses to the client device 106. In one embodiment, after the host device 124 sends 216 its host ID, the connection between the on-premises server 116 and the host device 124 is maintained by exchanging (not shown) keep-alive packets.

Referring to FIG. 3 an example method 300 for on-premises data access according to one embodiment is shown. In the illustrated embodiment, the host device 124 sends an initialization request 302 to the notification server 122. The notification server 122 exchanges 304 keep-alive packets to maintain a connection through the firewall and/or NAT. At some point in time, a client device 106 seeking to access on-premises data from the host device 124 sends 306 an HTTP request with the data including the host ID associated with that host device 124. Subsequent to receiving the HTTP request, the on-premises server 116 sends 308 a message including the host ID to the notification server 122. The notification server 122 sends 310 an on-premises notification message to the host device 124 using the notification channel being maintained by the exchange 304 of keep-alive packets. The host device 124 upon receiving the on-premises notification message knows a client device 106 is attempting to access on-premises data associated with the host device 124 and initiates a connection with the on-premises server 116, and the host device 124 sends 312 its host ID to the on-premises server 116.

The on-premises server 122 matches (not shown) the host data including the host ID received 312 from the host device 124 with the client data from the client device 106 that sent a HTTP request including that same host ID, and, in one embodiment, notifies (not shown) the client device 106 that a connection has been established with the host device 124. The on-premises server 116 passes queries and other requests received 314b from the client device 106 to 314a the host device 124 and passes responses received 314a from the host device 124 to 314b the client device 106.

Referring to FIG. 4 an example method 400 for on-premises data access according to one embodiment is shown. At block 402, the on-premises server 116 receives an HTTP request including a host ID from a client device 106. At block 404, the on-premises server 116 sends a message including the host ID received in the HTTP request received at block 402 to the notification server 122.

The notification server 122, upon receiving the host ID sent by the on-premises server 116 at block 404, determines a host device 124 associated with the host ID at block 406. In one embodiment, the notification server 122 determines the host device 124 using host data 130. For example, the host data includes a look up table, list or other data structure for keeping track of the one or more host devices 124 the notification server is connected to and, in on embodiment, on what connection port. At block 408, the notification server 122 generates and sends an on-premises notification message to the host device 124 associated with the host ID sent by the on-premises server 116 at block 404 and received by the notification server 122.

At block 410, responsive to receiving the on-premises notification message sent by the notification server 122, the host device 124 initiates a connection (i.e., a pass-through channel) with the on-premises server 116, and, at block 412, the host device 124 sends its host ID to the on-premises server 116.

At block 414, the on-premises server 116 receives the host ID from the host device 124. At block 416, the on-premises server 116 determines the client device 106 associated with a request including the same host ID as the host ID received from the host device 124 at block 414. In one embodiment, the determination at block 416 made using client-host data 134. For example, in one embodiment, client host data 134 is stored by the on-premises server 116 in a table, list or other data structure and used by the on-premises server 116 to match a connection with a host device 134 to a connection with a client device 106 that sent a request identifying that host device 124. At block 418, the on-premises server 116 receives a query from the client device 106 determined at box 416 and passes the query to the host device 124. At block 420, the on-premises server 116 receives, from the host device 124, a response to the query sent at block 418 and passes the response to the client device 420.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

Reference in the specification to "one embodiment," "an embodiment," "one implementation" or "an implementation" means that a particular feature, structure, or characteristic described in connection with the embodiment is included in at least one embodiment. The appearances of the phrase "in one embodiment" in various places in the specification are not necessarily all referring to the same embodiment.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc.

Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A method comprising:
   transmitting, by a host device situated behind a network separation device, an initialization request to a server, the initialization request initiating a first channel associated with the host device and the server through the network separation device;
   receiving, by the host device, a notification message from the server via the first channel, the notification message indicating that a client device is requesting to communicate with the host device;
   responsive to receiving the notification message via the first channel, initiating, by the host device, a second channel associated with the host device and the client device through the network separation device; and
   communicating data between the host device and the client device via the second channel.

2. The method of claim 1, wherein the server is configured to:
   responsive to receiving the initialization request from the host device, register host data of the host device with the server.

3. The method of claim 2, wherein the host data of the host device includes one or more of a host identifier of the host device and a connection port on which the host device is connected to the server.

4. The method of claim 1, further comprising:
maintaining the first channel between the host device and the server using one or more keep-alive packets.

5. The method of claim 4, wherein maintaining the first channel between the host device and the server includes:
exchanging the one or more keep-alive packets between the host device and the server at a frequency less than a timeout period.

6. The method of claim 4, wherein maintaining the first channel between the host device and the server includes:
transmitting the one or more keep-alive packets bidirectionally between the host device and the server.

7. The method of claim 4, wherein maintaining the first channel between the host device and the server includes:
transmitting the one or more keep-alive packets unidirectionally from one of the host device to the server and the server to the host device.

8. The method of claim 1, wherein the server is configured to:
receive a first message specifying the host device with which the client device is requesting to communicate;
responsive to receiving the first message, determine that the host device has host data of the host device registered with the server and that the first channel between the host device and the server is maintained; and
responsive to determining that the host device has the host data of the host device registered with the server and the first channel between the host device and the server is maintained, transmit the notification message to the host device via the first channel.

9. The method of claim 1, wherein communicating the data between the host device and the client device via the second channel includes:
receiving, by the host device, a query of the client device via the second channel; and
transmitting, by the host device, a response for the query of the client device via the second channel.

10. The method of claim 1, further comprising:
maintaining the second channel associated with the host device and the client device using one or more keep-alive packets.

11. A system comprising:
one or more processors; and
a memory storing instructions that, when executed by the one or more processors, cause a device, which is situated behind a network separation device, to:
transmit an initialization request to a server, the initialization request initiating a first channel associated with the device and the server through the network separation device;
receive a notification message from the server via the first channel, the notification message indicating that a client device is requesting to communicate with the device;
responsive to receiving the notification message via the first channel, initiate a second channel associated with the device and the client device through the network separation device; and
communicate data between the device and the client device via the second channel.

12. The system of claim 11, wherein the server is configured to:
responsive to receiving the initialization request from the device, register data of the device with the server.

13. The system of claim 12, wherein the data of the device includes one or more of a host identifier of the device and a connection port on which the device is connected to the server.

14. The system of claim 11, further including instruction that, when executed, cause the system to:
maintain the first channel between the device and the server using one or more keep-alive packets.

15. The system of claim 14, wherein maintaining the first channel between the device and the server includes:
exchanging the one or more keep-alive packets between the device and the server at a frequency less than a timeout period.

16. The system of claim 14, wherein maintaining the first channel between the device and the server includes:
transmitting the one or more keep-alive packets bidirectionally between the device and the server.

17. The system of claim 14, wherein maintaining the first channel between the device and the server includes:
transmitting the one or more keep-alive packets unidirectionally from one of the device to the server and the server to the device.

18. The system of claim 11, wherein the server is configured to:
receive a first message specifying the device with which the client device is requesting to communicate;
responsive to receiving the first message, determine that the device has data of the device registered with the server and that the first channel between the device and the server is maintained; and
responsive to determining that the device has the data of the device registered with the server and the first channel between the device and the server is maintained, transmit the notification message to the device via the first channel.

19. The system of claim 11, wherein communicating the data between the device and the client device via the second channel includes:
receive, by the device, a query of the client device via the second channel; and
transmit, by the device, a response for the query of the client device via the second channel.

20. The system of claim 11, further including instructions that, when executed, cause the system to:
maintain the second channel associated with the device and the client device using one or more keep-alive packets.

* * * * *